United States Patent [19]

Roof

[11] 4,286,495
[45] Sep. 1, 1981

[54] MUSICAL INSTRUMENT TRAINING DEVICE

[76] Inventor: John K. Roof, 22212 Leadwell St., Canoga Park, Calif. 91303

[21] Appl. No.: 75,884

[22] Filed: Sep. 17, 1979

[51] Int. Cl.³ .................. C09B 15/00; G10D 3/06
[52] U.S. Cl. .................. 84/485 R; 84/314 R; 84/477 R
[58] Field of Search .................. 84/314 R, 470, 477, 84/478, 485

[56] References Cited

U.S. PATENT DOCUMENTS

| | | | |
|---|---|---|---|
| 3,503,296 | 3/1970 | Schmoyer et al. | 84/478 |
| 3,837,256 | 9/1974 | Gullickson | 84/478 |
| 4,061,072 | 12/1977 | Del Castillo | 84/478 |
| 4,080,867 | 3/1978 | Ratanangsu | 84/478 X |

Primary Examiner—Lawrence R. Franklin
Attorney, Agent, or Firm—Roger A. Marrs

[57] ABSTRACT

An electrical device is disclosed herein for training a student to play a string instrument which includes a first group of visual indicators mounted on the neck of a fret board and each indicator being immediately beneath and in registry with a particular string and fret of the instrument so as to identify therewith. A second group or plurality of visual indicators are mounted on the fret board adjacent the sounding hole in spaced relationship to the first plurality of visual indicators and each one is associated with a particular string to be strummed for a particular musical chord. A plurality of switches is provided for a selection of musical chords and are operably connected to a diode matrix for energizing selected ones of the visual indicators in the first and second groups whereby the energized visual indicator pattern of the first group represents finger placement locations along the neck of the fret board for a selected musical chord and the energized visual indicator pattern of the second group represents appropriate strings to be strummed associated with the selected musical chord. A programming device may be substituted for the switches whereby the visual indicators are sequentially energized to represent a series of chord patterns for the purpose of student practice.

6 Claims, 7 Drawing Figures

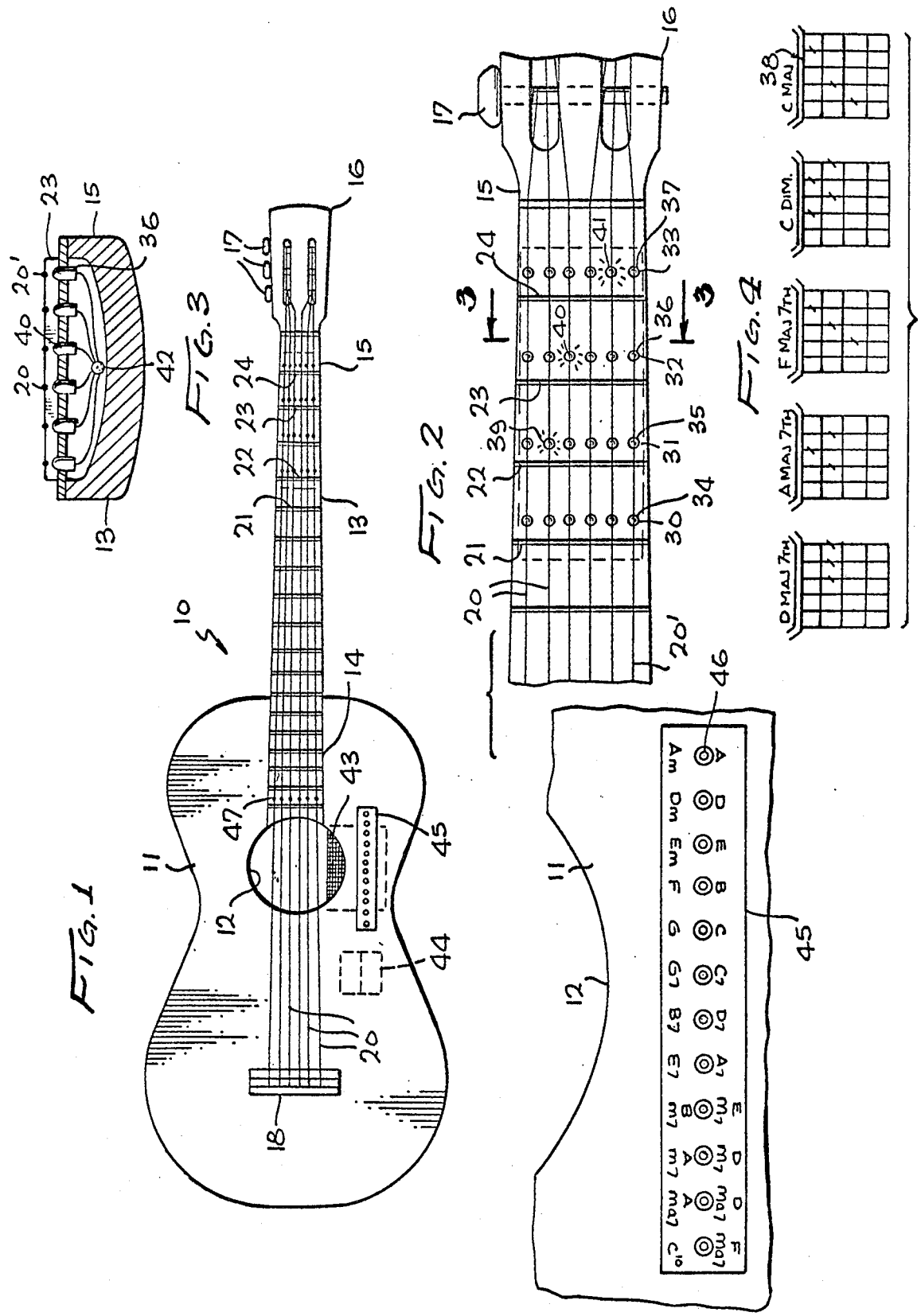

MUSICAL INSTRUMENT TRAINING DEVICE

BACKGROUND OF THE INVENTION

1. Field of the Invention

The present invention relates to musical training devices and more particularly, to a novel training aid for musical instruments incorporating groups of visual indicators corresponding to selected musical chords identifying finger placement locations on the sound elements of the instrument.

2. Brief Description of the Prior Art

In the past, it has been the conventional practice for a student learning to play a stringed instrument, such as a guitar for example, to visually place his fingers at precise fret and string locations on the instrument corresponding to a printed chord diagram displayed in an instruction book or sheet music. The diagram generally includes a finger location pattern of two, three or four fingers intended to be duplicated on the instrument by depressing particular strings so as to musically shorten or lengthen the strings.

Actual practice of this teaching or learning method is awkward and cumbersome due to the fact that the student first looks at the diagram in the instruction book and then turns his head to look at the fret board. This tendency also causes the student to twist or turn the instrument to an unnatural position so he can see the fret board and the appropriate location of the finger pattern. Such a procedure produces undesirable habits which require further training.

Furthermore, this conventional procedure requires the student to carry the finger location pattern in his mind while his eye leaves the instruction book or music sheet and focuses on the fret board and his finger placement. Usually, several glances back and forth are performed before the student has achieved the correct finger pattern.

Another common procedure resides in the practice of grasping the fingers of the student with those of the instructors or teacher's fingers and manually placing the student's fingers on the proper strings. This procedure is time consuming and awkward.

Some attempts have been made to employ self-help teaching aids such as perforated masks and specially contoured forms. Difficulties have been encountered which stem largely from the fact that the masks or forms slip from place and distract or erroneously indicate a finger pattern. Also, changes in the pattern cannot be made rapidly or with precision.

Therefore, a long standing need exists to provide a novel teaching aid which will indicate to the student proper finger placement without distortion of the instrument or his body and which can be rapidly changed from one finger pattern to another with precision.

SUMMARY OF THE INVENTION

Accordingly, the above problems and difficulties are obviated by the present invention which provides a novel teaching aid for musical instruments incorporating a first group of visual indicators located at manually deployable members such as keys or strings and a second group of visual indicating means associated with the same keys or strings in spaced relationship with respect to the first group. Switch means are interconnected between the first and second groups of indicators via a diode matrix whereby selected musical chords having representative finger patterns may be visually displayed. A feature resides in providing a program means whereby a variety of chord patterns can be displayed with precision and in a controlled sequence or series.

Therefore, it is among the primary objects of the present invention to provide a novel musical instrument training aid whereby visual indication is produced corresponding to finger locations for a given group or set of musical chords.

Another object of the present invention is to provide a novel musical training aid wherein not only are chord patterns represented by finger locations visually indicated on the instrument but other visual indicating means are incorporated and associated therewith indicating particular strings of a stringed instrument to be strummed.

Still another object of the present invention is to provide a novel training aid for musical instruments which is easy to activate and does not require physical manipulation or movement of the student.

A further object of the present invention is to provide a novel teaching air for use in connection with stringed instruments, such as a guitar, wherein the chord pattern for the left hand is indicated by a first group of lights and proper string strumming for the right hand is indicated by a second group of lights.

Still a further object of the present invention is to provide a novel teaching aid having programing means for introducing a variety of finger patterns representing musical chords to a stringed instrument whereby the student has advantage of rapid manipulation between the variation sequence or series so that his playing ability can be accelerated.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a top plan view of a musical instrument taking the form of a guitar incorporating the present invention therein;

FIG. 2 is an enlarged top plan view of the neck of the fret board and the area surrounding the sounding hole illustrating the visual means for displaying chord patterns;

FIG. 3 is a transverse cross-sectional view of the fret board mounted on the guitar shown in FIG. 2 as taken in the direction of arrows 3—3 thereof;

FIG. 4 is a diagramatic illustration showing a variety of typical musical chords as displayed in an instruction book or on a music sheet;

DESCRIPTION OF THE PREFERRED EMBODIMENT

Figure 5:
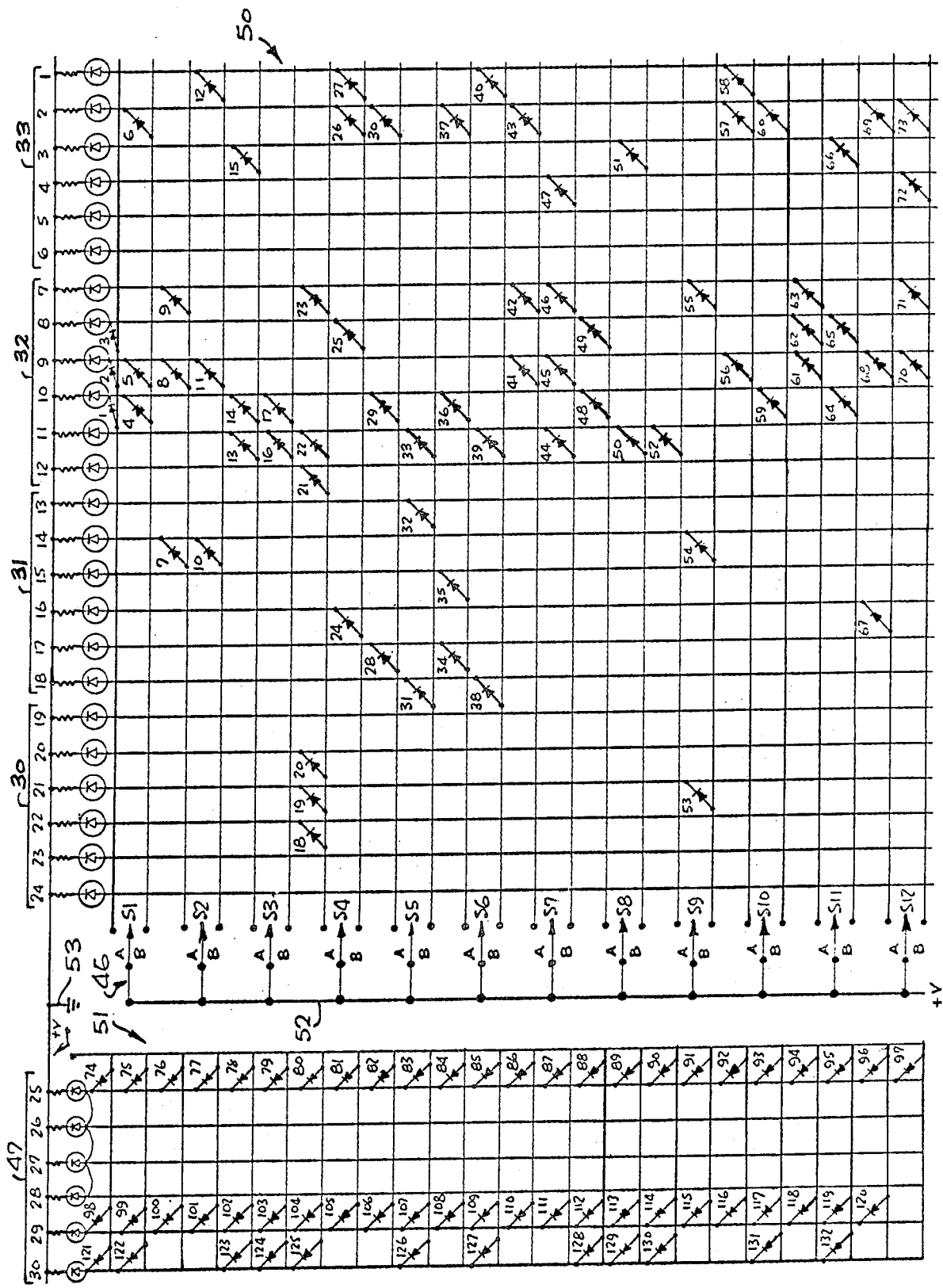
FIG. 5 is a diagramatic and schematic illustration of a diode matrix including switch activators therefore whereby a variety of visual indicators are energized corresponding to selected musical chords.

The concept of the present invention relates to a variety of musical instruments such as stringed instruments wood winds and the like. However, for purposes of clarification and explanation, the present invention will be described with respect to a conventional guitar which is shown in the general direction of arrow 10 in FIG. 1. In general, the guitar 10 includes a main body 11 which is hollow and which includes a sounding hole 12 provided in the top panel of the body. The instrument further includes an elongated fret board 13 having a base portion 14 terminating adjacent the sound hole 12 and a neck portion 15 which is outwardly cantilevered and which terminates in an end 16 mounting a plurality of tuning screws or keys, such as tuning screw 17. The guitar further includes a plurality of strings, such as six strings as illustrated, which are extended between a holding block 18 at one end and the respective tuning screws or keys 17 at their opposite ends. The strings are arranged in substantially fixed spaced apart relationship and are generally parallel to each other. The strings are illustrated by the numeral 20 and are trained over a plurality of transverse raised members carried on the fret board and referred to as frets such as is illustrated by the numerals 21, 22, 23 and 24 carried on the neck 15 of the fret board 13. Thus, the foregoing description relates to a typical guitar having six strings and music is derived from the instrument by the musician depressing selected strings between particular frets so that the musical length of the string is shortened or lengthened whereby particular sounds representing notes are emanated from the sounding hole 12. After the strings have been selected and shortened or lengthened accordingly, employing one hand of the musician, the other hand is employed for strumming or picking the strings adjacent the sounding hole 12 so that the strings are vibrated to produce the desired effect. Typically, the depressed strings along the neck 15 of the fret board represent chords which are normally indicated on sheet music or in instruction books and FIG. 4 portrays a plurality of chords as normally displayed by such medium. The diagramatic illustration in FIG. 4 is of the frets and strings and the diagonal marks thereon indicate the finger depressions on particular strings between particular frets.

Referring now in detail to FIG. 1, the present invention includes a training means whereby the chords illustrated in FIG. 4 may be readily displayed on the neck 15 of the fret board so that the student musician can visually observe the exact positions of his fingers so as to depress proper strings between particular frets. In order to indicate the coordinates for finger depression with respect to a given string so as to simulate the coordinates of the pattern presented on the printed page as shown in FIG. 4, the present invention includes a plurality of visual indicating means such as lights which are located in rows and columns on the neck of the fret board immediately beneath the group or plurality of strings 20 between adjacent ones of the frets 21-24 inclusive.

In FIG. 2, for example, it can be seen that rows 30-33 inclusive of lights are arranged adjacent to frets 21-24 inclusive and that each of the lights in the rows 30-33 inclusive lie immediately beneath and in registry with one of the six strings forming the group of strings 20. For example, string 20' crosses frets 21-24 inclusive and is in registry with lights 34-37 respectively in each of the rows. Therefore, it can be seen that when it is desired to instruct a student to depress strings at a coordinate indicated by the chord diagram 38, lights 39, 40 and 41 are illuminated and it is these lights that require covering by the three fingers of the student's hand in order to achieve the musical chord indicated by the diagram 38.

Referring now in detail to FIG. 3, it can be seen that the row of lights 32 are mounted in respective apertures in the fret board 13 and that wires leading from the row of lights are combined in a cable 42 leading to the diode matrix circuitry of the present invention as indicated by numeral 43 in FIG. 1. For convenience, the diode matrix is placed on a circuit board and mounted on the body 11 of the instrument and power for energizing the circuit is provided from a battery source indicated in broken lines by numeral 44.

Referring now in detail to FIG. 2, it can be seen that the instrument body 11 includes a switch panel 45 containing a plurality of switches such as indicated by numeral 46. These switches are employed not only for selecting the finger pattern of lights to be energized with respect to the rows of lights 30-33 inclusive but selects a light pattern in a single row of lights indicated by numeral 47 in FIG. 1. This latter set or group of six lights under the fret nearest the sounding hole 12 indicates the proper strings to be strummed or picked with the corresponding chord energized by the selection of lights in rows 30-33 inclusive. Proper indicia associated with each of the switches 46 displays the chord information available for selection by the student.

Referring now in detail to FIG. 5, the diode matrix incorporated into the present invention and the various switches for selecting the light patterns is illustrated. The diode matrix is divided into a matrix indicated in the direction of arrow 50 which represents a matrix for selecting the patterns for the rows of lights 30-33 inclusive and a second matrix indicated in the direction of arrow 51 relating to the pattern or selection of lights associated with the single row 47. The diodes shown in the diagram are light emitting diodes and are interconnected in the circuit according to a particular matrix. A plurality of conventional diodes are also included in the wiring and are associated with the light emitting diodes so that selected one of the light emitting diodes is energized upon the actuation of a particular switch. The switches 46 are indicated by the characters S1 through S12 and the switches include a pair of contacts A and B selected by a switch arm which is connected in common along a busline 52. The busline is connected to a positive voltage source and the plurality of light emitting diodes are connected to ground 53 via a plurality of resistors. The conventional diodes associated in the matrix 50 are identified by numerals 1-73 inclusive while the conventional diodes included in the matrix 51 are indicated by numeral 74-132 inclusive.

Therefore, it can be seen that an inexpensive training device for a stringed instrument such as a guitar is provided which employs a unique system of lights incorporated into the first four frets of the instrument's neck or fret board. The electrical circuit is battery operated and switch controlled so as to enable the student or instructor to energize and illuminate one of twenty four chords which will indicate the proper strings to be depressed for the particular chord. In addition, the group of six lights 47 under the fret nearest the sounding hole 12 indicates the proper strings to be strummed corresponding to the selected musical chord.

A further feature of the present invention pertains to an attachment for converting a standard musical instrument such as a guitar to employ the concept described with respect to the light system shown in FIGS. 1-5 respectively. The attachment need not be built into the instrument as previously described but may merely consist of two bridges or adaptors that will raise the strings whereby the attachment can be placed under the strings which includes the light unit attaching to the first four frets o the guitar and a control box housing the electronic components and switches. The concept is identical except that the attachment may be readily assembled or disassembled from the standard guitar unit.

Further, it is to be understood that an optional attachment is envisioned which will enable the student or instructor to insert a printed circuit board or card into a readout device that will cause a desired series or sequences of musical chords to be indicated or flashed on the proper frets in a predetermined and correct sequence. Thus, the student is enabled to practice chord changes and progressions. As an example, when the key of G is selected, a card is inserted into the unit and when actuated, would cause the following chords to be flashed in a sequence, ie, G, C, D7 and G. The tempo or speed of these progressions would be controlled by the employment of a dial potentiometer. For achieving the series of chords in a proper sequence, reference is now made to the block diagram of FIG. 6.

Figure 6:
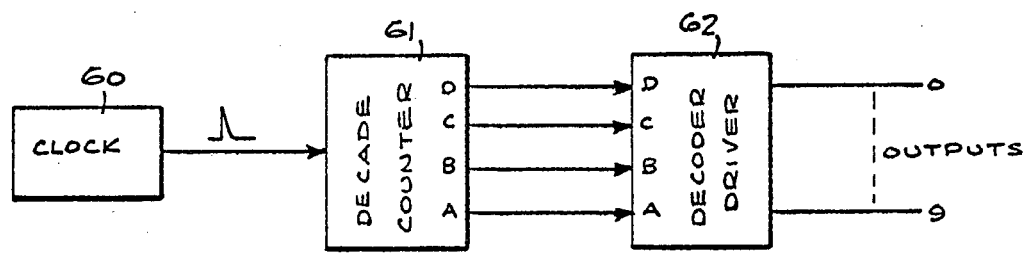
FIG. 6 is a block diagram of a modification employed in the present invention for programming a variety of musical chords to be played in a particular sequence or series.

In FIG. 6 a digital sequencer is illustrated in block diagram form wherein the circuit consists of a three sub-system arrangement comprising a clock reference circuit 60, a decade counter 61 and a decoder driver 62. The decoder driver is a binary coded decimal-to-decimal driver and the circuit for the digital sequencer is shown in FIG. 7.

Figure 7:
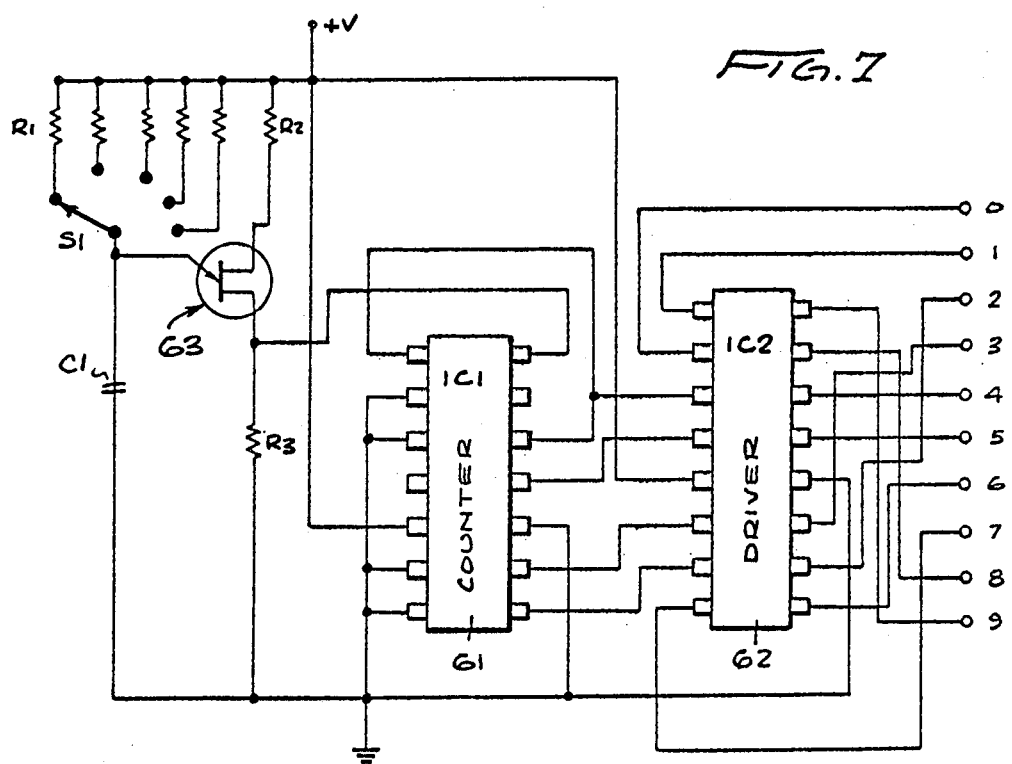
FIG. 7 is a schematic drawing of the programming means shown in FIG. 6.

With detailed reference to FIG. 7, it can be seen that the reference clock is a unijunction transistor oscillator 63 which generates a repetitive pulse train to actuate the sequencer throughout its cycle of operation. The width of each pulse and the rate of their occurence can be varied by altering capacitor C1, resistor R1, or both. The time constant is a function of capacitance times resistance (C1×R1) for the rate of occurence. The decade counter 61 provides a binary coded decimal readout for an incoming count of pulses 0-9 inclusive and then recycles. The counter is an integrated circuit and identified by the character 1C1.

The decoder driver 62 is an integrated circuit 1C2 and accepts the four line input from the counter and converts each pulse to its respective decimal equivalent. The resulting decimal output appears as a lowered (grounded) voltage at one of its ten outputs. Since all light emitting diodes on the guitar have plus voltage on their cathodes, any particular musical chord configuration that has the light emitting diode anode voltage lowered (grounded) will energize and light.

Another variation of the present invention resides in a unique display wherein the light emitting diodes may be energized along the entire length of the fret board so that the lights would flash in response to guitarist's fingering. Such a display may be used by accomplished guitarists and need not be used by students or instructors.

In view of the foregoing, it can be seen that the unique training aid of the present invention provides a means for displaying musical chords directly onto the neck of the guitar so that the chord pattern may be readily identified by the student whereby his fingers may be employed to cover the energized lights. The results would be the proper string depression for that particular musical chord. The light row associated with strumming indicates to the student the proper strings to be struck for the particular musical chord selected. The device is relatively inexpensive to manufacture and may be incorporated into original equipment as well as an attachement to be included onto fabricated equipment. The teaching aid does not interfere with any of the normal structure of the device and does not interfere with the hands of the user.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A training aid incorporated into the construction of a stringed instrument intended to be finger strummed with one hand and finger depressed strings with the other hand, the combination comprising:

a first group of lights mounted on the fret board of said instrument comprising four transverse rows associated with each of the last four frets respectively;

a second group of lights mounted on the fret board of said instrument comprising a single row of lights immediately adjacent the sounding hole of said instrument;

each of said lights in said first and said second rows lying immediately beneath and in registry with the strings of said instrument;

a diode matrix mounted on said instrument and operably coupled to said first and said second groups of lights whereby selected ones of said lights in said first group display a variety of patterns corresponding to musical chords and whereby selected ones of said lights in said second group display particular strings to be strummed; and manually operated switch means connected to said diode matrix fo selectively energizing said selected ones of said lights so as to illuminate said musical chord patterns and string strumming pattern.

2. The invention as defined in claim 1 including programming means connected to said diode matrix for providing a series of musical chords to be displayed by said first and second groups of lights.

3. The invention as defined in claim 2 wherein said programming means further includes timing means for determining the rate of musical chord change in said series.

4. A musical instrument training device comprising:

a plurality of finger operated elements operably carried on said instrument for generating musical sounds;

a plurality of visual indicating means mounted on said instrument in registry with each of said finger operated elements respectively;

selection means coupled to said visual indicating means for energizing selected ones of said visual indicating means corresponding to a given musical chord whereby certain ones of said finger operated elements are identified;

said selection means includes:

a diode matrix;

a plurality of switches coupled to said diode matrix for energizing said selected visual indicating means;

said afroementioned visual indicating means constitutes a first group of visual indicating means whereby multiple indication is provided for a combined pattern corresponding to said given musical chord;

a second group of visual indication means operably coupled to said diode matrix and responsive to said switches for energizing selected ones of said visual indication means of said second group associated with and in registry with each of said finger operated elements;

said visual indicating means are light emitting diodes operably connected together in said diode matrix to produce energized light patterns in response to actuation of said plurality of switches;

said musical instrument is a guitar having a body with a sounding hole and an elongated fret board mounting a plurality of transverse frets and a plurality of strings extended longitudinally over said frets between opposite ends of said fret board;

said first group of indicating light emitting diodes arranged in four rows adjacent four of said frets further away from said sounding hole;

said second group of indicating light emitting diodes arranged in a single row adjacent said fret closest to said sounding hole; and said switches mounted on said body in close proximity to said sounding hole.

5. The invention as defined in claim 4 wherein said diode matrix comprises a pair of diode networks, one of which is connected to said first group of light emitting diodes and another connected to said second group of light emitting diodes.

6. The invention as defined in claim 5 including programming means operably coupled into said diode matrix networks for energizing said light emitting diodes in a particular sequence of patterns corresponding to a repetitive series of musical chords.

* * * * *